United States Patent [19]
Juergens

[11] 3,782,757
[45] Jan. 1, 1974

[54] MUD FLAP ASSEMBLY AND BRACKET THEREFOR

[75] Inventor: Alfred J. Juergens, Muskegon, Mich.

[73] Assignee: Fleet Engineers, Inc., Muskegon Heights, Mich.

[22] Filed: Sept. 19, 1972

[21] Appl. No.: 290,400

[52] U.S. Cl. ............................................ 280/154.5
[51] Int. Cl. .............................................. B62b 9/16
[58] Field of Search ................................. 280/154.5

[56] References Cited
UNITED STATES PATENTS

| | | | |
|---|---|---|---|
| 2,640,714 | 6/1953 | Garner et al. | 280/154.5 R |
| 2,652,266 | 9/1953 | Miller | 280/154.5 R |
| 2,660,453 | 11/1953 | Russell et al. | 280/154.5 R |
| 2,801,867 | 8/1957 | Childreth | 280/154.5 R |
| 2,970,849 | 2/1961 | Betts | 280/154.5 R |
| 3,224,791 | 12/1965 | Sogoian | 280/154.5 R |
| 3,401,953 | 9/1968 | Prohl et al. | 280/154.5 R |

Primary Examiner—Leo Friaglia
Attorney—John E. McGarry

[57] ABSTRACT

A mud flap mounting assembly and a mounting bracket therefor wherein the mounting bracket is formed of a narrow elongated plate of elongated cross-section, one end of the plate being twisted through an angle of approximately 90° with respect to the other end about the longitudinal axis of the plate, and also being bent through an angle of approximately 90° with respect to the other end about an axis transverse to the longitudinal axis of the plate. The mud flap can then be mounted directly to one end of the plate and the other end can be mounted directly to a vehicle or can be removably mounted in a socket on the vehicle for ease of removal of the bracket.

10 Claims, 4 Drawing Figures

PATENTED JAN 1 1974

3,782,757

MUD FLAP ASSEMBLY AND BRACKET THEREFOR

BACKGROUND OF THE INVENTION

1. Field of the Invention

This invention relates to a mud flap mounting assembly. In one of its aspects, the invention relates to a mounting bracket for a mud flap mounting assembly.

2. State of the Prior Art

Mud flaps are well known accessories for vehicles such as tractors and trailers. Mud flap hangers must be securely retained by the vehicle behind the wheels but, must be able to flex horizontally in forward and rearward directions and vertically as well to prevent damage to the hanger from loading docks, road vibrations and the like. In some cases, the mud flap hanger is secured permanently to the vehicle behind the wheels. In other cases, it is desirable to interchange mud flaps or to change the position of the mud flaps on the vehicle. In these latter cases, a temporary mounting is desirable.

Many of the mud flap mounting assemblies have been of complicated and rather expensive designs in order to accomplish the aforementioned requirements. Examples of such constructions are disclosed in U.S. Pat. Nos. to Sogoian, 3,224,791, and Miller, 2,652,266. still another mud flap construction is disclosed in the U.S. Pat. No. To Betts, 2,970,849. The Betts structure uses a round or square rod stock which has a central portion bent into a coil spring to permit the outer flap holding portion to flex vertically as well as horizontally. A square stock is used when the flap construction is to be removably mounted in a socket holder, and a round stock is used when the bracket is to be more permanently secured to the vehicle. The mud flap is hung from an outer portion of the rod with special brackets.

SUMMARY OF THE INVENTION

According to the invention, there is provided a mud flap mounting assembly including a bracket formed of a narrow elongated plate having a narrow rectangular or elongated cross-section. One end of the plate has means for securing a mud flap thereto.

A mounting end at an opposite end of the plate has means for mounting the plate on a vehicle. The mounting end is twisted through an angle of substantially 90° with respect to the mud flap end about an axis parallel to the longitudinal axis of the plate, and the mounting end is also bent through an angle of substantially 90° with respect to the mud flap end about an axis transverse to the longitudinal axis of a plate. The plate is made from a highly resilient material such as spring steel so that the mud flap end of the plate is free to flex in all directions in a plane parallel to the mounting end of the plate.

Desirably, the mud flap end of the plate has a plurality of elongated holes to receive bolts through which the mud flap is mounted on the bracket. The mud flap can be mounted directly on the bracket with bolts or can be clamped between the bracket and a retaining strap for more uniform clamping of the mud flap on the bracket.

The mounting end of the bracket desirably contains at least two holes by which the bracket can be directly secured to the vehicle. Alternatively, the bracket can be temporarily or removably mounted in a socket which is permanently secured to the vehicle for ease of interchange or shifting of the mud flaps of the brackets.

BRIEF DESCRIPTION of the DRAWINGS

The invention will now be described with reference to the accompanying drawings in which.

DETAILED DESCRIPTION OF THE PREFERRED EMBODIMENTS

Figure 1:
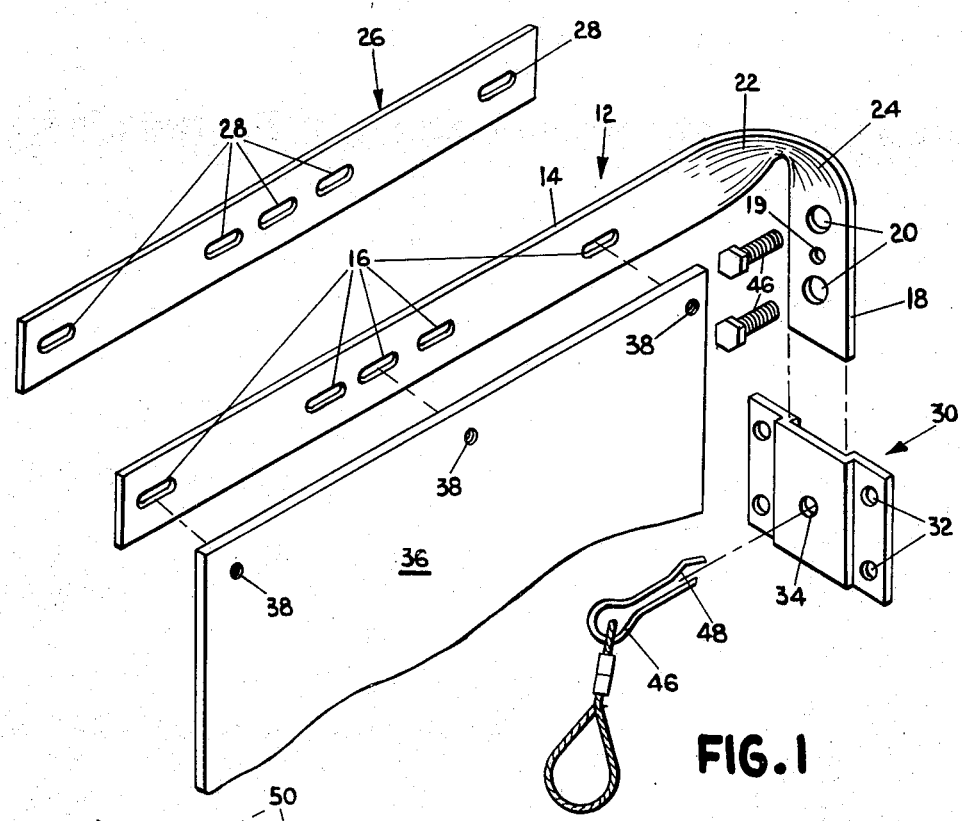
FIG. 1 is a perspective view of a mud flap and mounting assembly according to the invention in exploded form.

Referring now to the drawings, a spring bracket 12 is formed of an elongated plate or strap of blank stock. The bracket has an outer portion 14 with a plurality of elongated holes 16. A mounting end 18 having a pair of holes 20 is bent at a 90° angle to the outer portion in a transverse direction and in an axial direction. Thus, the spring bracket 12 has a 90° transverse bend 24 and a 90° axial bend or twist 22. In other words, the spring bracket 12 is bent 90° about an axis which is transverse or perpendicular to the axial length of the bracket 12, and in addition is twisted through a 90° angle at 22 about an axis which is parallel to the axial length of the bracket 12.

A retaining strap 26 is provided to clamp a mud flap 36 to the outer portion 14 of the spring bracket 12. The retaining strap 26 has a plurality of elongated holes 28 which are aligned with the holes 16 in the outer portion 14 of the spring bracket 12. The mud flap 36 has a plurality of holes 38 which are aligned with at least some of the holes 16 and 28 in the spring bracket 12 and the retaining strap 26 respectively. Holes 44 extend through the elongated holes 16 in the bracket 12, through the holes 38 in the mud flap 36 and through the elongated holes 28 in the retaining strap 26 to secure the mud flap 36 between the outer portion 14 of the bracket 12 and the retaining strap 26.

The spring bracket 12 can be secured directly to the vehicle support through bolts 46 which extend through holes 20 in the mounting end 18. Alternately, the mounting end 18 can be slidably received within a socket 30 which is mounted onto a vehicle frame 40 through bolts 42. To this end, the socket 30 has a pair of holes 32 on either side thereof to receive the bolts 42.

Figure 4:
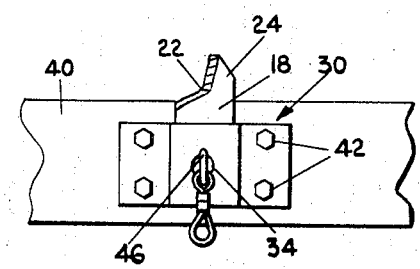
FIG. 4 is a view taken along lines 4—4 of FIG. 3.

The mounting end 18 of the spring bracket 12 has a hole 19 which is aligned with a hole 34 in the raised central portion of the socket 30. A safety pin 46 having a retaining bend 48 is received into the holes 34 and 19 when the mounting end 18 is within the socket 30 as illustrated in FIG. 4. The safety pin 46 thus retains the bracket 12 within the socket 30. However, the bracket 12 can be easily removed by merely pulling the safety pin 46 and lifting the bracket 12 upwardly.

Figure 2:
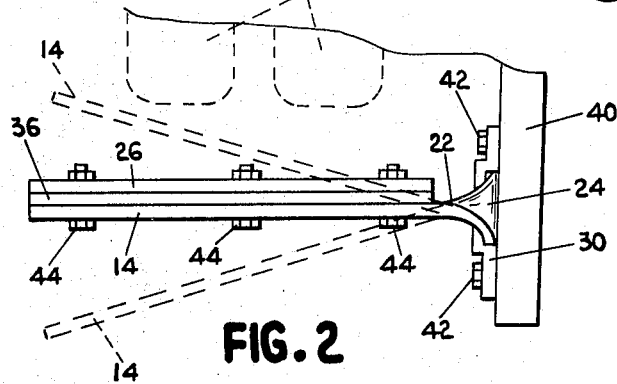
FIG. 2 is a plan view of a mud flap and mounting assembly in operative position on a vehicle.
Figure 3:
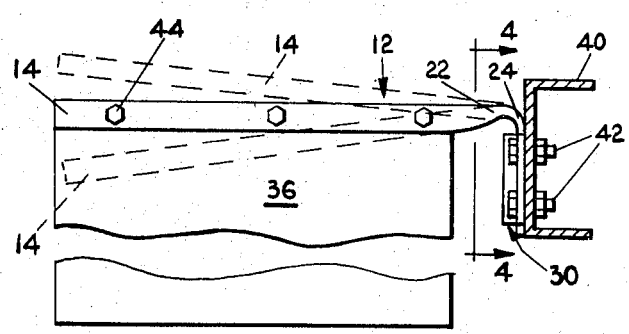
FIG. 3 is an elevational view of the mud flap and mounting assembly.

As illustrated in FIG. 2, the spring bracket 12 suspends the mud flap 36 in operative position behind wheels 50 of a vehicle. The mud flap is conventionally mounted on trailer trucks, on tractors for trailer trucks and similar types of vehicles. As illustrated by phantom lines in FIG. 2, the bracket 12 is free to flex horizontally at the twist 22. As illustrated by phantom lines in FIG. 3, the outer end 14 of the bracket 12 is also free to flex vertically at the transverse bend 24. The outer end 14 of the bracket 12 is thus free to flex in all directions in a plane parallel to the mounting end 18.

The bracket 12 is desirably made from an elongated blank of spring steel which forms a narrow elongated rectangle in cross-section so that the bracket has a high degree of flexibility and resiliency. The blank has an elongated cross-section to provide flexibility at the bent portions and strength at the outer and mounting ends. For example, a suitable blank stock of spring steel 0.204 × 2 inches in cross-section can be used. A suitable type of spring steel would be an annealed 5155-H spring steel, heat treated after fabrication to 40–48RC.

The length of the outer portion 14 of the bracket will depend on the type of vehicle with which the mud flap is used. Suitable lengths of the outer portion 14 of the bracket 12 are 29 – 30 inches and, for this distance, an initial blank stock of 0.204 × 2 × 35 inches can be used.

This spring bracket 12 is made by first punching the slotted holes in the blank stock of, for example, 0.204 × 2 × 35 inches. The blank is then twisted through an angle of about 90° to 92° at approximately 7 inches from one end of the stock about an axis parallel to the length of the bracket. The blank is then bent about an axis 90° to the length of the bracket through an angle of about 90° to 92° so that the mounting end 18 is at an angle of 90° to the outer portion 14. Desirably, the bends in the spring bracket are slightly greater than that required to allow for a slight "spring back" during subsequent heat treatment of the bracket member.

The invention provides a simple, easily constructed, and inexpensive mounting bracket for the mud flap. Yet, the bracket is very durable and functions in a required manner so that the mud flap can flex vertically as well as horizontally as illustrated by the phantom lines in FIGS. 2 and 3. Thus, the mounting bracket permits a flexibility in all horizontal and vertical directions about its mounting end 18. Te twisting and bending of the bracket around the bends 22 and 24 permit the full range of movement of the mud flap bracket. The wide contour of the bracket firmly secures the mud flap to the bracket so that any swinging movement of the mud flap will be resiliently resisted by the bracket. In other words, the clamping and firm mounting of the bracket assembly prohibits the mud flap 36 from rotating with respect to the bracket mounting so that the mud flap will be resiliently urged to its functional vertical position. Further, the clamping of the mounting assembly more evenly distributes the force required to hold the mud flap to minimize tearing of the mud flap at holes 38.

The flat mounting end 18 of the bracket with the holes 19 and 20 ofthe bracket gives a great deal of versatility to the mounting assembly. The bracket can be directly mounted to the frame of the vehicle without a socket, or the bracket can be portably or temporarily mounted in the socket 30 for ease of removal and replacement.

The elongated holes 16 in the outer portion 14 of the bracket 12 facilitate lateral adjustment of the mud flap on the bracket 12 to compensate for vehicle frame variations. In addition, the elongated holes 16 accommodate a wide range of different size mud flaps with differing spacing of mounting holes.

Reasonable variation and modification are possible within the scope of the foregoing disclosure, the drawings, and appended claims without departing from the spirit of the invention.

The embodiments of the invention in which an exclusive property or privilege is claimed are defined as follows.

1. A bracket for mounting a mud flap, said bracket comprising a narrow elongated plate of elongated cross-section and of a spring like material, said plate having means at one end for mounting a mud flap, and a mounting end at an opposite end of said plate for mounting said plate on a vehicle, said mounting end being twited through an angle of substantially 90° with respect to said one end about an axis parallel to the longitudinal axis of said plate, said mounting end being also bent through an angle of substantially 90° with respect to said one end about an axis transverse to said longitudinal axis of said plate, and means for mounting said mounting end to a vehicle, whereby said one end of said plate is free to flex in all directions in a plane parallel to the mounting end of said plate.

2. A bracket according to claim 1 wherein said plate is made from a spring steel material.

3. A bracket according to claim 1 wherein said mounting means for said mounting end includes at least one hole in said mounting end.

4. A bracket according to claim 1 wherein said mud flap mounting means includes a plurality of elongated holes in said one end of said plate.

5. A mud flap mounting assembly comprising:
a bracket formed of a narrow elongated plate of a spring like material and having an elongated cross section, said plate being twisted at a central portion through an angle of substantially 90° about an axis parallel to the longitudinal axis of said plate; and further being bent at said central portion through an angle of substantially 90° about an axis transverse to the longitudinal axis of said plate;
means for mounting a mud flap to one end portion of said plate; and
means for mounting the other end of said plate to a vehicle, whereby a mud flap at said one end of said plate is free to flex in all directions in a plane parallel to the other end of said plate.

6. A mud flap mounting assembly according to claim 5 wherein said plate is formed of spring steel.

7. A mud flap mounting assembly according to claim 5 wherein said mounting means for said other end of said plate includes at least one hole in said other end.

8. A mud flap mounting assembly according to claim 5 wherein said mounting means for said other end of said plate includes a socket, means for securing said socket to a vehicle, and means for releasably retaining said other end of said plate in said socket when the same is secured to a vehicle.

9. A mud flap mounting assembly according to claim 5 wherein said mud flap mounting means further includes a retaining strap of generally equal size to said one end of said plate, and means to clamp said mud flap between said retaining strap and said one end of said plate.

10. A mud flap mounting assembly according to claim 5 wherein said mud flap mounting means includes a plurality of elongated holes in said one end of said plate.

* * * * *